United States Patent
Anderson et al.

(10) Patent No.: US 10,578,638 B2
(45) Date of Patent: Mar. 3, 2020

(54) ARRANGEMENT OF DAMS IN AIR DATA PROBE

(71) Applicant: Honeywell International Inc., Morris Plains, NJ (US)

(72) Inventors: Morris G. Anderson, Mesa, AZ (US); Murali Krishnan Payangapadan, Bangalore (IN); Narasimha Reddy Venkatarayappa, Bangalore (IN); Grant A. Gordon, Peoria, AZ (US); Rama Sateesh Venkata Kandula, Visakhapatnam (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/158,793

(22) Filed: Oct. 12, 2018

(65) Prior Publication Data

US 2019/0041421 A1    Feb. 7, 2019

Related U.S. Application Data

(63) Continuation of application No. 15/457,912, filed on Mar. 13, 2017, now Pat. No. 10,126,320.

(51) Int. Cl.
*G01P 13/00*    (2006.01)
*G01P 5/16*    (2006.01)
(Continued)

(52) U.S. Cl.
CPC .................... *G01P 5/165* (2013.01)

(58) Field of Classification Search
CPC ............ G01P 5/16; G01P 13/00; B64D 15/12
See application file for complete search history.

(56) References Cited

U.S. PATENT DOCUMENTS

| 2,984,107 | A |   | 5/1961 | Strieby et al. |
| 3,535,930 | A | * | 10/1970 | Rees ...................... B64D 15/12 |
|  |  |  |  | 73/861.68 |

(Continued)

FOREIGN PATENT DOCUMENTS

| EP | 1275952 | 1/2003 |
| EP | 3009847 | 4/2016 |

(Continued)

OTHER PUBLICATIONS

European Patent Office, "The Extended European Search Report and the Search Opinion from EP Application No. 18161086.6 dated Jun. 22, 2018", "from Foreign Counterpart of U.S. Appl. No. 15/457,912", Jun. 22, 2018, pp. 1-8, Published in:EP.

(Continued)

*Primary Examiner* — Jewel V Dowtin
(74) *Attorney, Agent, or Firm* — Fogg & Powers LLC

(57) ABSTRACT

An air data probe is provided. The air data probe includes a pitot probe having a mounting base or flange, support strut, and tube with a forward facing inlet that is configured to capture a total pressure of the surrounding air, at least three dams placed within the tube of the pitot probe for blocking the ballistic trajectory of water droplets or ice crystals from passing directly through the tube to a downstream pressure sensing element, and a heater element integrated into the tube of the pitot probe on the outside of the dams. The at least three dams are oriented within the tube of the pitot probe in such a way that the dam locations are configured for two or more installations of the air data probe.

10 Claims, 11 Drawing Sheets

(51) Int. Cl.
    *B64D 15/12*     (2006.01)
    *G01P 5/165*     (2006.01)

(56) References Cited

U.S. PATENT DOCUMENTS

| | | | |
|---|---|---|---|
| 4,378,697 A | | 4/1983 | DeLeo et al. |
| 5,337,602 A | * | 8/1994 | Gibson .................. G01P 5/165 73/182 |
| 5,601,254 A | | 2/1997 | Ortiz et al. |
| 6,070,475 A | * | 6/2000 | Muehlhauser ............ G01F 1/46 374/E13.006 |
| 6,892,584 B2 | | 5/2005 | Gilkison et al. |
| 9,116,162 B2 | * | 8/2015 | Leblond .................... G01P 5/10 |
| 9,207,253 B2 | | 12/2015 | Seidel et al. |
| 9,856,027 B2 | * | 1/2018 | Anderson .............. B64D 15/12 |
| 10,126,320 B2 | | 11/2018 | Anderson et al. |

FOREIGN PATENT DOCUMENTS

| | | |
|---|---|---|
| GB | 779754 | 7/1957 |
| GB | 867675 | 5/1961 |

OTHER PUBLICATIONS

U.S. Patent and Trademark Office, Notice of Allowance from U.S. Appl. No. 15/457,912 dated Mar. 28, 2018, pp. 1-12, Published in: US.

U.S. Patent and Trademark Office, Notice of Allowance from U.S. Appl. No. 15/457,912 dated Jul. 16, 2018, pp. 1-12, Published in: US.

U.S. Patent and Trademark Office, Corrected Notice of Allowability from U.S. Appl. No. 15/457,912 dated Aug. 16, 2018, pp. 1-6, Published in: US.

\* cited by examiner

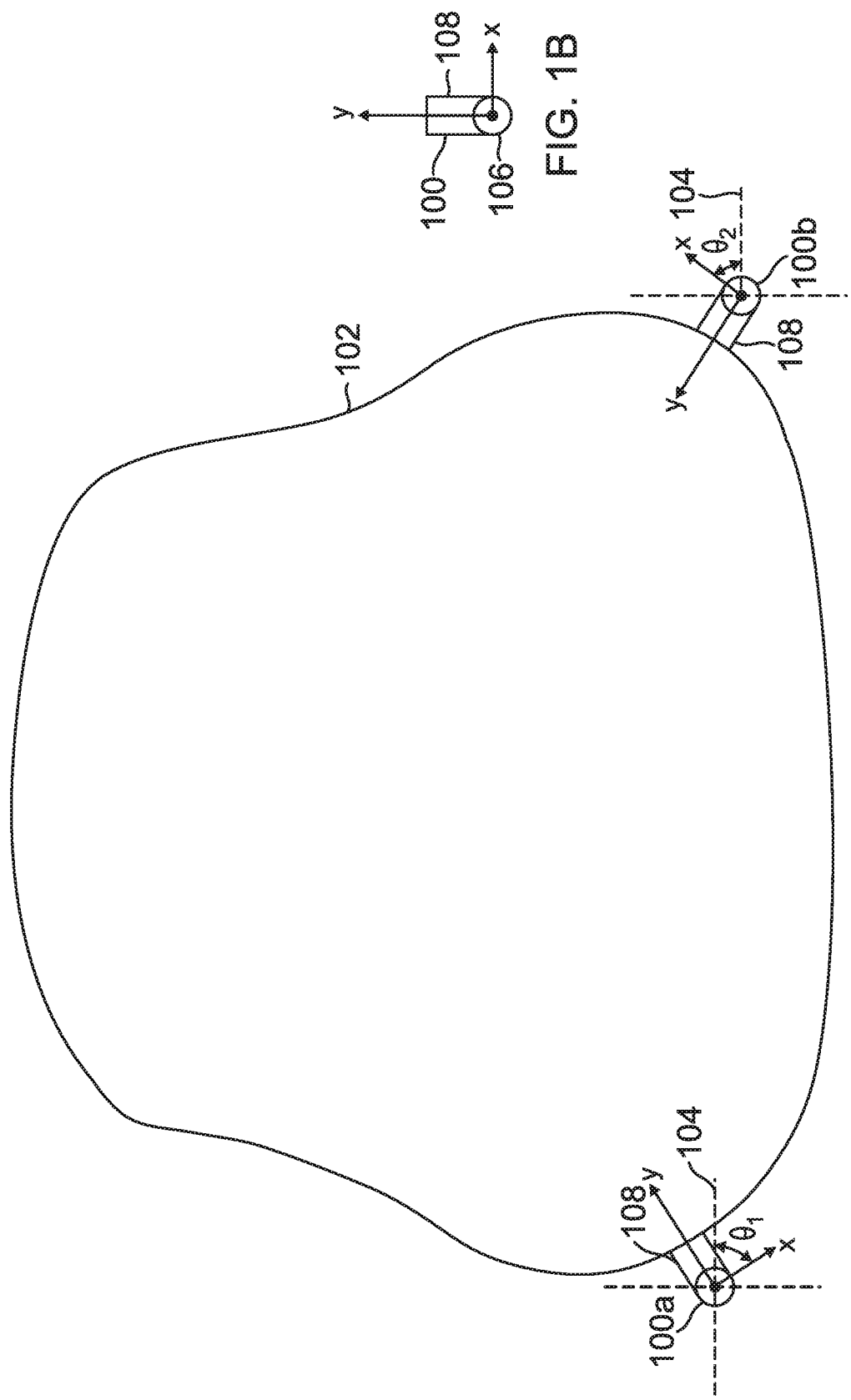

ARRANGEMENT OF DAMS IN AIR DATA PROBE

CROSS REFERENCE TO RELATED APPLICATIONS

The present application is a continuation of U.S. patent application Ser. No. 15/457,912, filed on Mar. 13, 2017 (the '912 application). The '912 application is incorporated herein by reference.

BACKGROUND

A pitot probe or tube is widely used as part of an aircraft data management system to determine the airspeed of an aircraft. In particular, by measuring stagnation pressure of a fluid driven into the pitot tube, together with a measured static pressure, the airspeed of the aircraft can be determined from the Bernoulli Equation.

A typical pitot tube is a hollow cylinder with heating elements, or coils, arranged internally or externally. The tip portion of the pitot probe is similar to a convergent nozzle consisting of an inlet and throat. The pitot tube inlet diameter can be greater than the throat diameter to improve pressure recovery.

In certain flight conditions, the pitot tube may ingest large amounts of ice crystals or super cooled water droplets which may over power the capacity of the heater to keep the pitot unblocked and ice free. Or melted ice may run back past the high heat tip region of the pitot tube and freeze in a cooler region deep inside the pitot tube blocking the internal air flow and preventing an accurate total pressure measurement. Thus, many pitot probes are not able to pass recent changes to the icing regulations documented in SAE Aerospace Standards AS8006A and AS5562 which represent an increase icing threat. This is because the pitot tube becomes clogged by ice that forms within the internal flow passage of the probe.

The ingested ice crystals and water droplets must be blocked without freezing and prevented from traveling downstream of the Pitot probe where they could plug the Pitot probe and interfere with the total pressure measurement. It is common for pitot tubes to include two dams that are configured to block water droplets and ice crystals from traveling down the internal flow passage of the pitot tube. The dams in the Pitot probe block the water droplets and ice crystals from traveling deep into the probe and direct them to flow out through small drain holes in the pitot tube. Therefore, dams need to be properly oriented and heated to prevent ice buildup within the probe that could block the total pressure measurement.

Additionally it is common to use the same design for several pitot probes that are installed at different locations and orientations on an aircraft. This can cause problems for how ingested water is drained from the probes. Typically, the arrangement of the dams in the internal flow passage of the pitot tube do not have the same effectiveness in all orientations or installations of the pitot probe. Thus, some orientations of the same probe may allow ice to enter the probe more freely and then subsequently be melted by the heater. Furthermore this melted ice may be allowed to flow past the dams to an unheated region of the probe where the water can refreeze and block the pressure measurement. While other orientations may effectively prevent blockages due to icing.

For the reasons stated above and for other reasons stated below which will become apparent to those skilled in the art upon reading and understanding the specification, there is a need in the art for arrangement of dams in a pitot probe that meet icing regulations for multiple installations and orientations of the same pitot probe.

SUMMARY

In one embodiment, an air data probe is provided. The air data probe includes a pitot probe having a mounting base or flange, support strut, and tube with a forward facing inlet that is configured to capture a total pressure of the surrounding air, at least three dams placed within the tube of the pitot probe for blocking the ballistic trajectory of water droplets or ice crystals from passing directly through the tube to a downstream pressure sensing element, and a heater element integrated into the tube of the pitot probe on the outside of the dams. The at least three dams are oriented within the tube of the pitot probe in such a way that the dam locations are configured for two or more installations of the air data probe.

DRAWINGS

Embodiments of the present invention can be more easily understood and further advantages and uses thereof more readily apparent, when considered in view of the description of the preferred embodiments and the following figures in which:

FIGS. 1A and 1B illustrate one embodiment of an air data probe installed on an aircraft in two orientations.

In accordance with common practice, the various described features are not drawn to scale but are drawn to emphasize features relevant to the present invention. Reference characters denote like elements throughout figures and text.

DETAILED DESCRIPTION

Figure 2A:
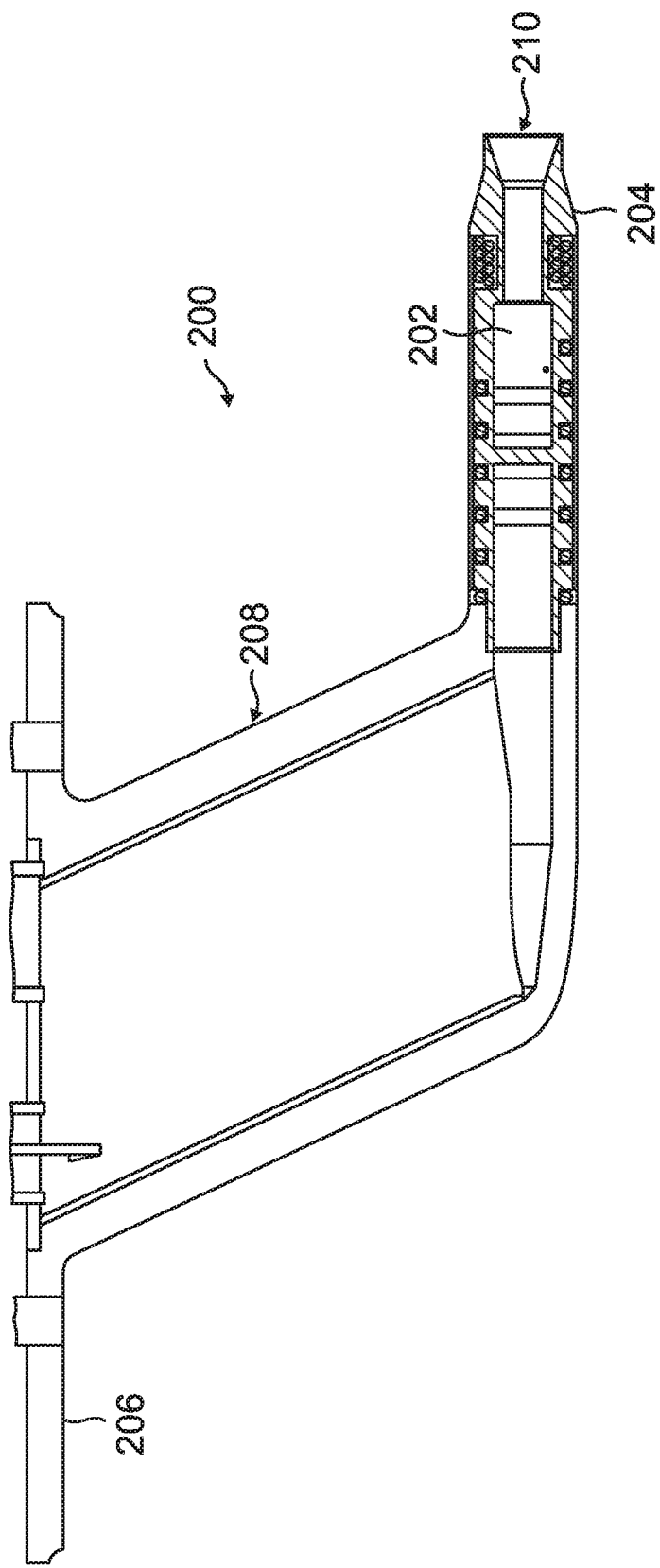
FIG. 2A is a side view of one embodiment of an air data probe in partial cross section that illustrates the use of at least three dams in the internal flow passage of a pitot tube of the air data probe.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide an air data probe that use more than two dams strategically positioned inside of the pitot probe. The dams can be formed into the probe first, and the heater can then be formed or wrapped around the probe and dams. This enables the heater layout to be designed to properly heat each dam. In turn, the design enables the dams to effectively block, melt, and drain the ice crystals/water droplets so that the water/ice crystals do not travel downstream of the pitot probe. This approach also simplifies the manufacturing process of the probe because the integration of the heater is separated from the layout requirements of the internal dams.

The use of more than two dams enables the same air data probe to provide good icing protection when mounted in different orientations on the aircraft such as on the right or left side at different angles from the horizontal plane. In both installations, embodiments of the air data probe are able to meet the ever increasing specifications for icing requirements set by industry standard setting organizations and governments. In effect, the use of extra dams allows the designer to place the dams in locations such that in each orientation at least one of the dams will block approximately half of the height of the internal flow path of the pitot probe thus half of the pitot probe would have to fill with water before overflowing the dam and traveling downstream of the pitot probe. Existing pitot tube designs with a pair of dams do not provide such significant blockage in multiple installations and may not be able to meet the more stringent icing requirements in one or both orientations.

FIGS. 1A and 1B illustrate one embodiment of an air data probe 100 installed on an aircraft 102 in two orientations or installations. As illustrated in FIG. 1B, air data probe 100 includes a strut 108 that is connected to a pitot tube 106. As a frame of reference, strut 108 extends perpendicular to pitot probe 106 in the Y direction of the X-Y coordinate plane and pitot tube or probe 106 extends out from the page in Z direction. As illustrated in FIG. 1A, air data probe 100a is positioned on aircraft 102 in a first orientation or installation. Additionally, air data probe 100b is also positioned on aircraft 102 on a side opposite air data probe 100a in a second orientation or illustration. As indicated in FIG. 1A, air data probe 100a is oriented at an angle $\theta_1$ relative to the X axis of the X-Y coordinate plane of air data probe 100 of FIG. 1B. Similarly, air data probe 100b is oriented at an angle $\theta_2$ relative to the X axis of the X-Y coordinate plane of air data probe 100 of FIG. 1B. Advantageously, air data probe 100 is designed with a set of dams that block the ballistic trajectory of water droplets or ice crystals from passing directly through the pitot tube 106 to a downstream pressure sensing element in both orientations or installations as discussed in more detail below. In some embodiments the values of $\theta_1$ and $\theta_2$ are substantially the same. In other embodiments, the angles have different values. In either event, the dams of the air data probe 100 are oriented to work with the specific angles associated with the air data probes the various installations.

Figure 2B:
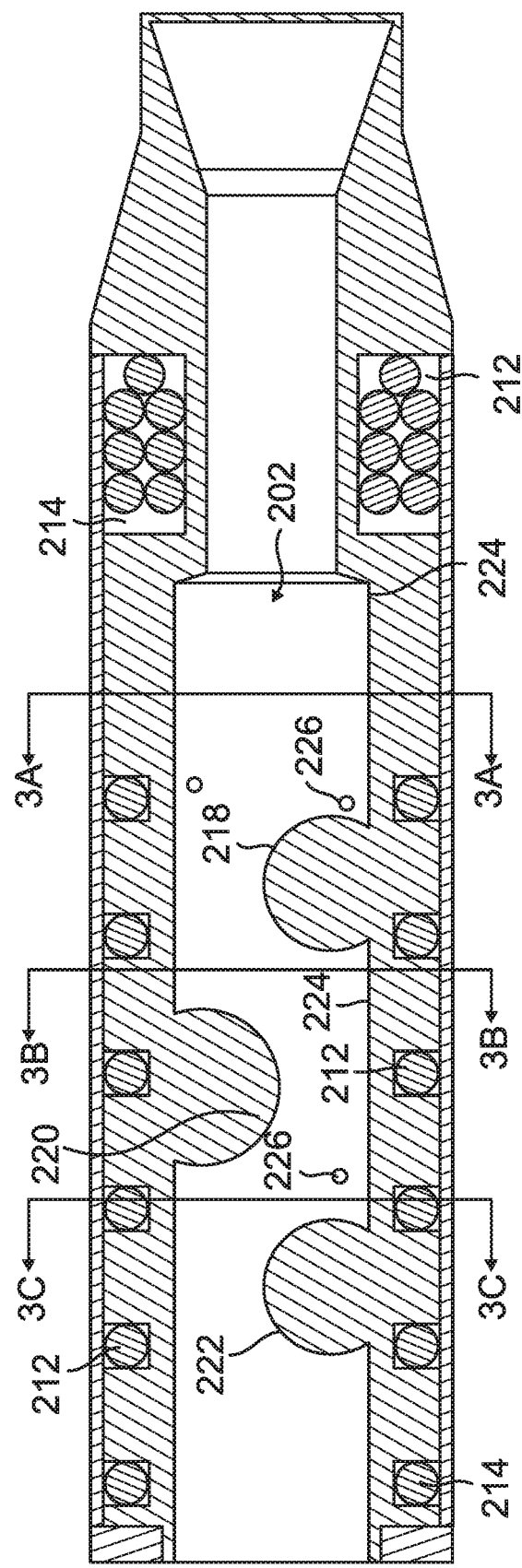
FIGS. 2B and 2C are enlarged cross-sectional views of the pitot tube of FIG. 2A.

FIG. 2A is a side view of one embodiment of an air data probe indicated generally at 200 in partial cross section that illustrates the use of at least three dams in the internal flow passage 202 of a pitot tube 204 of the air data probe 200. Air data probe 200 has a mounting base or flange 206, support strut 208, and pitot tube 204 with a forward facing inlet 210 that is configured to capture a total pressure of the surrounding air. As illustrated in FIG. 2B, pitot tube 204 also has a heating coil 212 that is positioned within groove 214 that is etched in an exterior surface of pitot tube 204. Additionally, pitot tube 204 also includes three dams, 218, 220, and 222, that are positioned to enable the air data probe 200 to be used in multiple orientations or installations while still providing acceptable blockage of water and ice in the internal flow path 202.

Figure 3B:
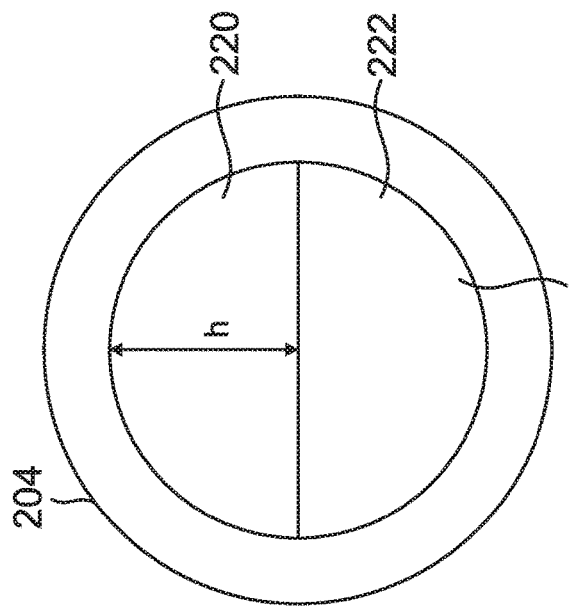
FIGS. 3A through 3C are cross-sectional views of FIG. 2B along lines 3A-3A, 3B-3B, and 3C-3C, respectively.
Figure 3C:
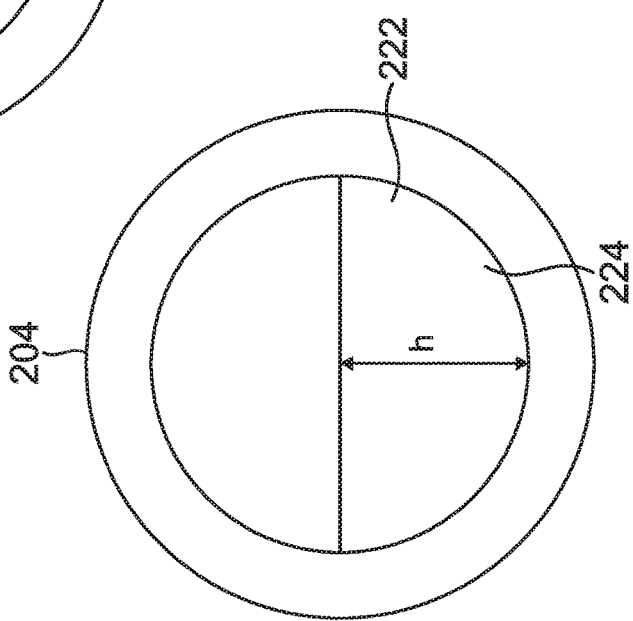
Figure 3A:
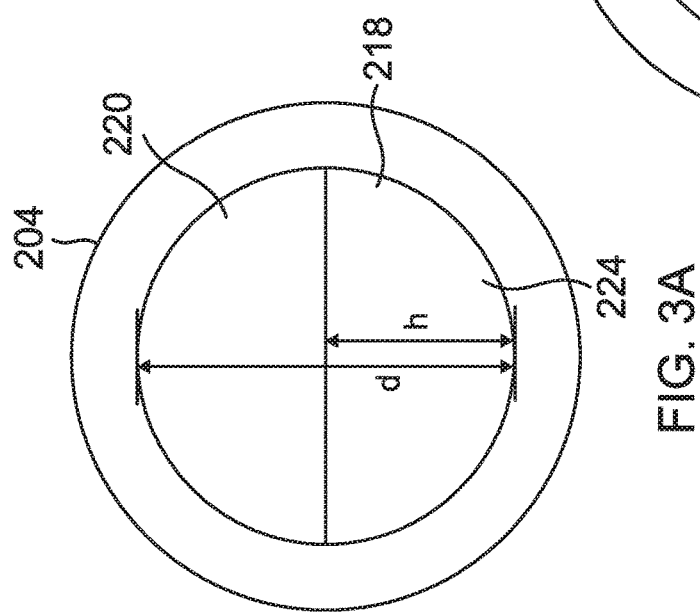

FIGS. 3A through 3C are cross-sectional views of FIG. 2B along lines 3A-3A, 3B-3B, and 3C-3C, respectively, and illustrate the orientation of the dams 218, 220 and 222 in internal flow path 202. As seen in FIG. 3A, dam 218 is positioned on the bottom of the internal flow path 202 in this orientation. Thus, air, water, ice crystals will either impact dam 218 or flow over and pass dam 218 and impact dam 220 which is located in the top of internal flow path 202.

The size and shape of dams 218, and 220 are chosen so that, together, the two dams cover the entire cross sectional area of the internal flow path 202. This way, water and ice crystals will be prevented from passing directly through the internal flow path 202 and interfering with the operation of the downstream pressure sensing element. Rather, in this orientation, water and ice crystals will impact either dam 218 or 220. Water and ice that impact dam 218 will puddle in the bottom 224 of the internal flow path 202 and exit through a drain hole 226. Water and ice that impact dam 220 will fall to bottom 224 of internal flow path 202 (FIG. 3B) and puddle in front of dam 222 and will exit through a drain hold 226. In this regard, dam 220 (forward) and dam 222 (rear) form a pair of dams that block water and ice crystals from reaching the pressure sensing device.

In some embodiments, the height, h, of each dam 218, 220, and 222 advantageously can be chosen to be half of the diameter or more of the internal flow path, d. Thus, the water level in the internal flow path 202 must exceed half of the diameter of the internal flow path or more before water overflows the dam and passes down the internal flow path 202 toward the pressure sensing element. In other embodiments, the dams are constructed with other appropriate heights. By heating the dams, any ice crystals are melted and the water is able to flow out of the internal flow path 202 and the pitot tube 204 avoids blockages that can lead to catastrophic failures.

Figure 2C:
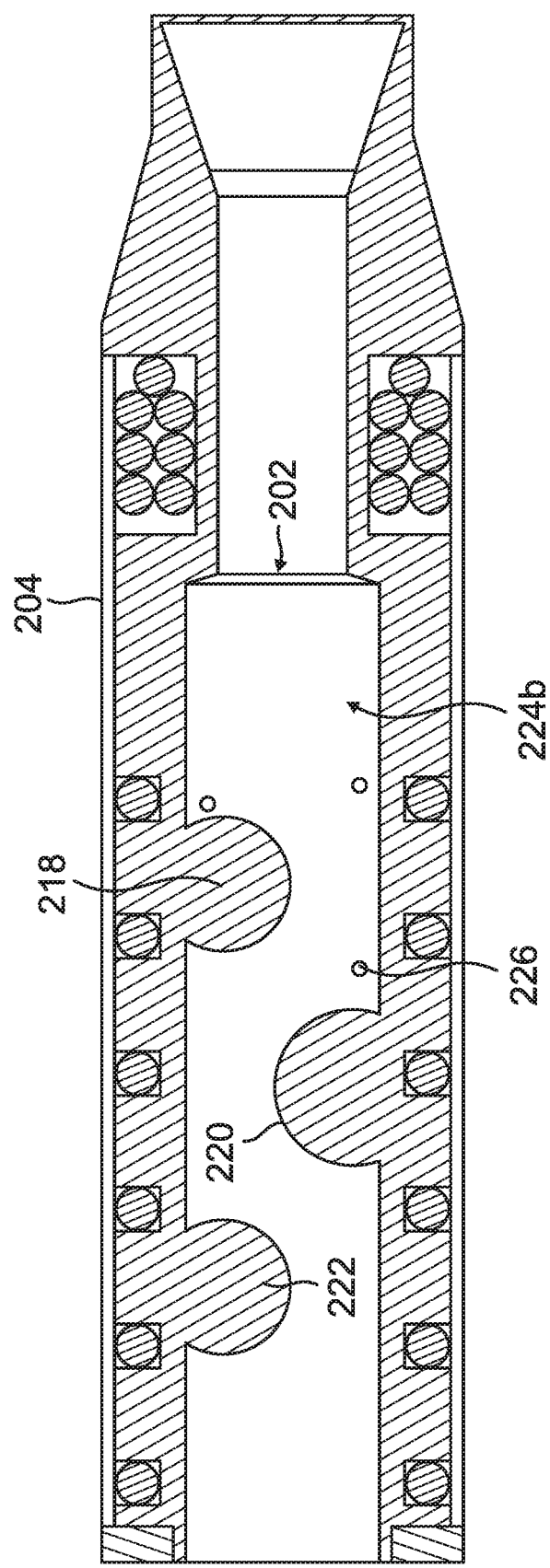

FIG. 2C illustrates the other orientation for pitot probe 204. In this orientation or installation, pitot probe 204 has been rotated by approximately 180 degrees although other angles of rotation could be used. In this orientation, water and ice crystals entering internal flow path 202 will either impact dam 218 or dam 220. The water will puddle in front of dam 220. A drain hole 226 is located in bottom 224b in this orientation so that the water that puddles up in front of dam 220 is able to exit pitot probe 204. In this orientation, dam 218 (forward) and dam 220 (rear) form a pair of dams that block water and ice crystals from reaching the pressure sensing device.

Figure 4A:
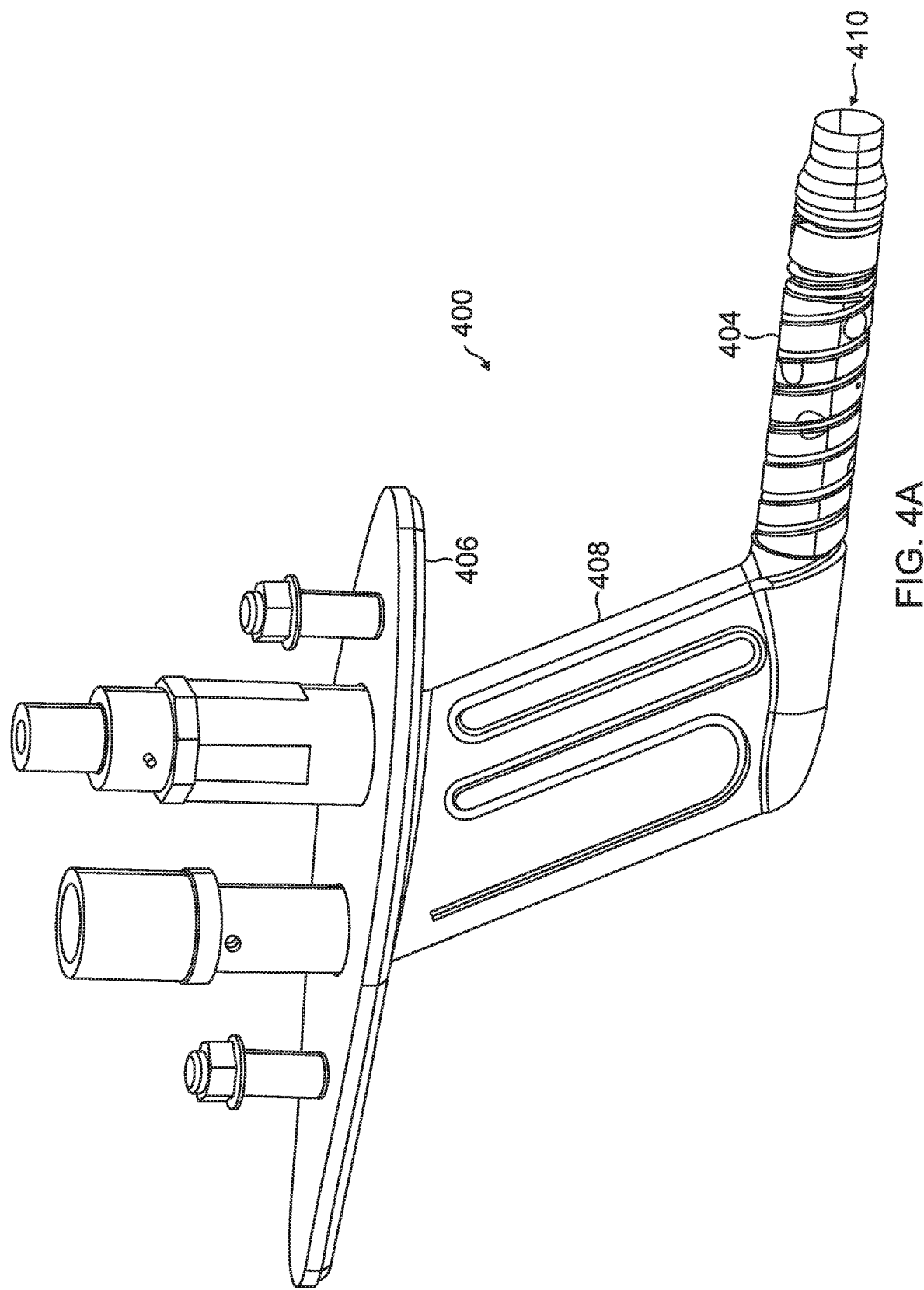
FIG. 4A is a perspective view of another embodiment of an air data probe with a pitot tube that incorporates four dams for blocking the ballistic trajectory of water droplets or ice crystals from passing directly through the tube to a downstream pressure sensing element.

FIG. 4A is a perspective view of another embodiment of an air data probe, indicated generally at 400, with a pitot tube 404 that incorporates four dams, 418, 420, 422, and 423, for blocking the ballistic trajectory of water droplets or ice crystals from passing directly through the pitot tube 402 to a downstream pressure sensing element. Air data probe 400 has a mounting base or flange 406, support strut 408, and pitot tube 404 with a forward facing inlet 410 that is configured to capture a total pressure of the surrounding air. Pitot tube 404 also has a heating coil 412 that is positioned within groove 414 (FIG. 4B) that is formed in an exterior surface of pitot tube 404, for example, by etching the groove. Additionally, pitot tube 404 also includes three dams, 418, 420, 422 and 423, that are positioned to enable the air data probe 400 to be used in multiple orientations or installations while still providing acceptable blockage of water and ice in the internal flow path 402.

Figure 4B:
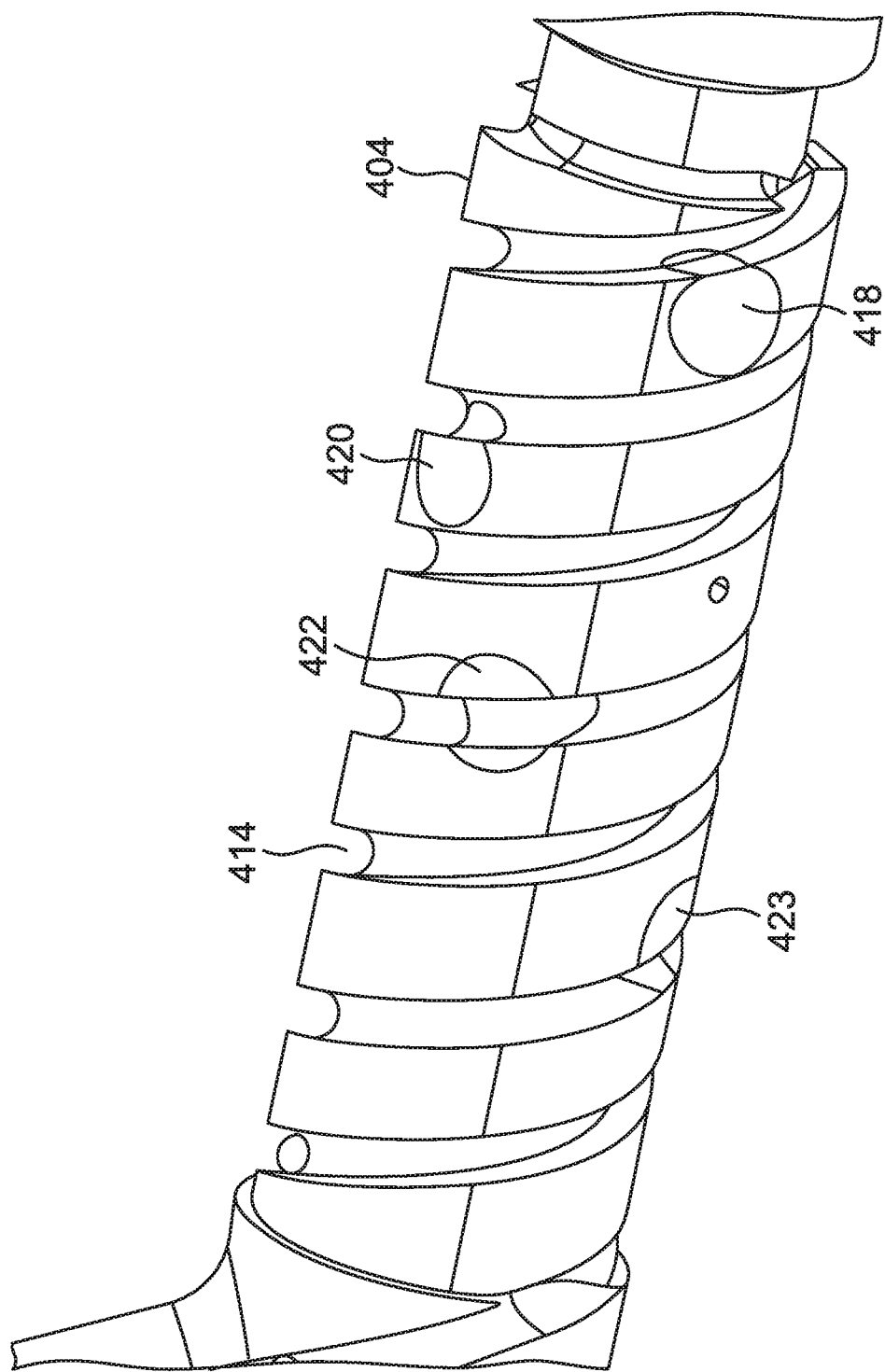
FIG. 4B is a close up side view of the pitot tube of FIG. 4A with a heating coil removed to illustrate the location of dams that have been inserted through holes in the side of the pitot tube.

FIG. 4B is a close up side view of the pitot tube of FIG. 4A with a heating coil removed to illustrate the location of dams that have been inserted through holes in the side of the pitot tube. These holes are drilled in pitot probe 404 so that dams 418 and 423 function as a first pair of dams in a first orientation or installation of air data probe 400. Further, holes are drilled in pitot probe 404 so that dams 420 and 422 function as a second pair of dams in a second orientation or installation of air data probe 400. In an alternate construction the probes and dams could be cast as an integral part. In one embodiment, dams 418 and 423 are offset from dams 420 and 422 by approximately the sum of the angles $\theta_1$ and $\theta_2$ shown in FIG. 1. This allows one of the pairs of dams to be oriented in a substantially horizontal position relative to the internal flow path 402 in each of the respective orientations of the air data probe to block water from flowing back into the probe. In one embodiment, the dams 418 and 423 are offset from dams 420 and 422 by an angle that provides maximum restriction to water flow when the probe is mounted on either side of a particular aircraft installation. In one embodiment, the offset is approximately 90 degrees although other offsets may be chosen to meet installation requirements of a specific air data probe.

Figure 4C:
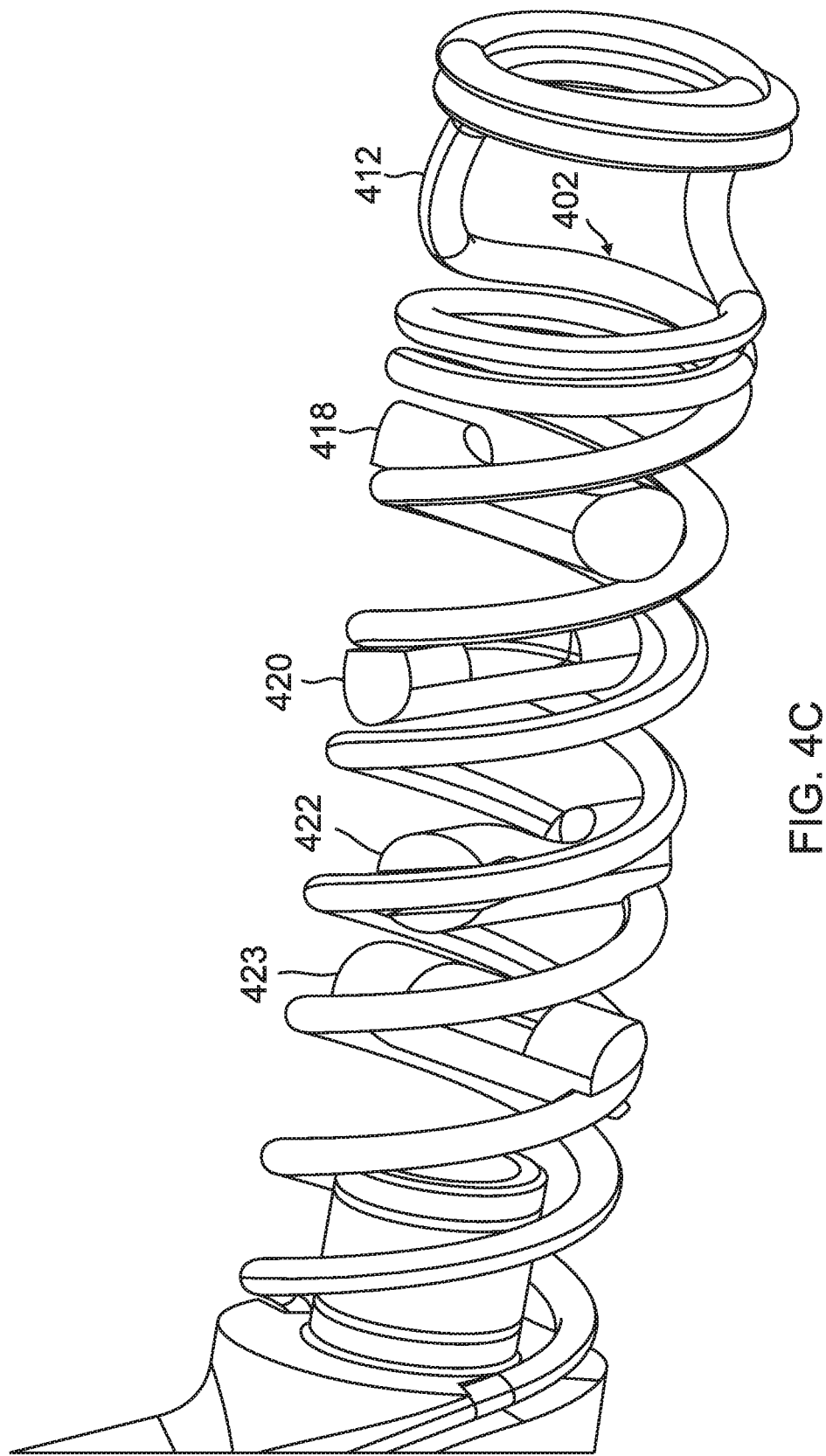
FIG. 4C is a side view in perspective of the pitot tube of FIG. 4A with the tube body removed to illustrate the relationship between the heating coil and the dams.

Air data probe 400 includes a mechanism for heating the pitot tube 404 as well as the dams 418, 420, 422, and 423. Channel 414 is cut into an exterior surface of pitot probe 404. Channel 414 is configured so that it passes over at least one end of each dam 418, 420, 422, and 423. This is illustrated in FIG. 4C which is a side view in perspective of the pitot tube 402 of FIG. 4A with the tube body removed to illustrate the relationship between the heating coil 412 and the dams 418, 420, 422 and 423.

Figure 4D:
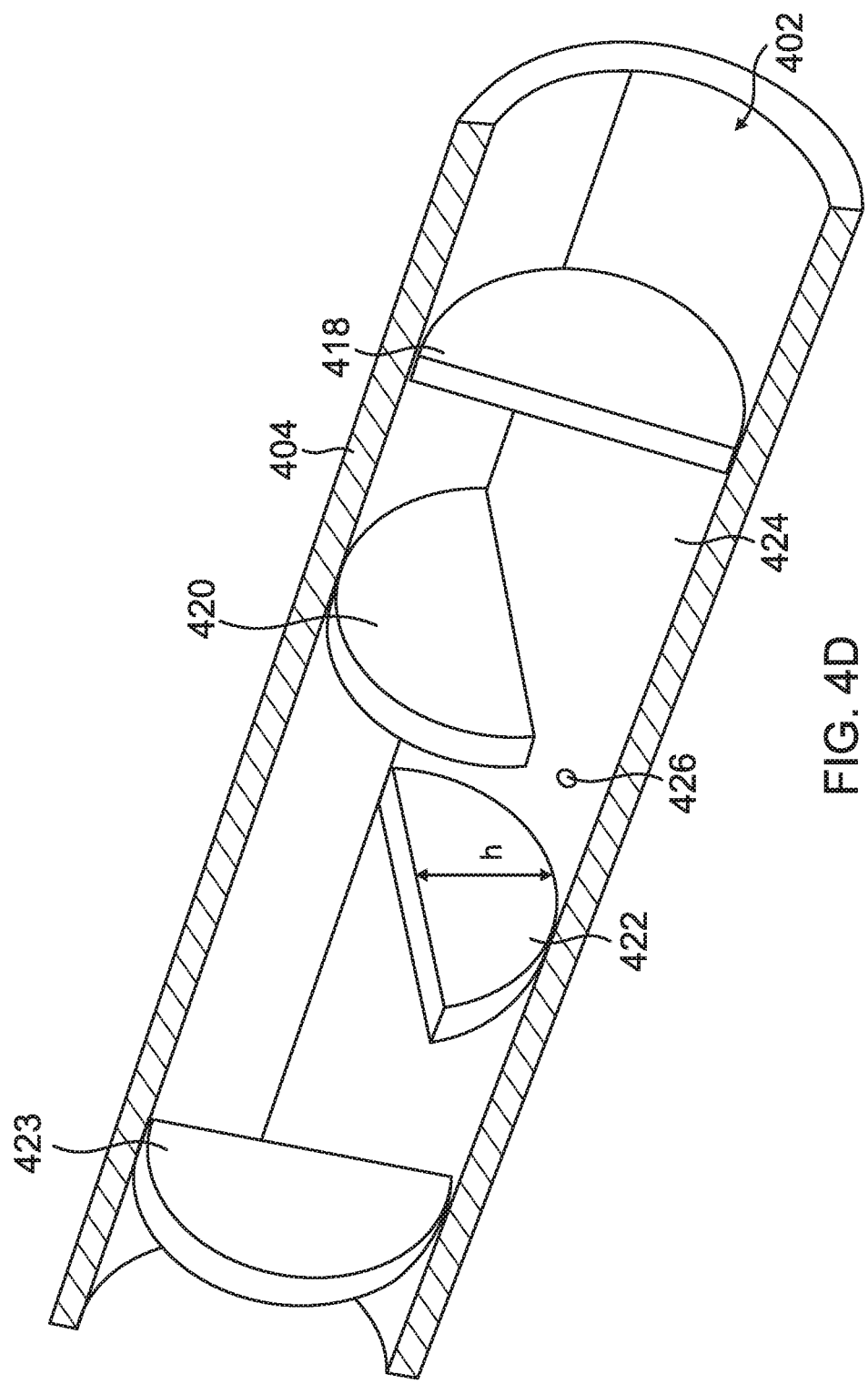
FIGS. 4D and 4E are perspective views of the pitot tube with a portion of the body of the pitot tube removed to illustrate the orientation of the dams of the air data probe of FIG. 4A in two different orientations or installations of the air data probe.
Figure 4E:
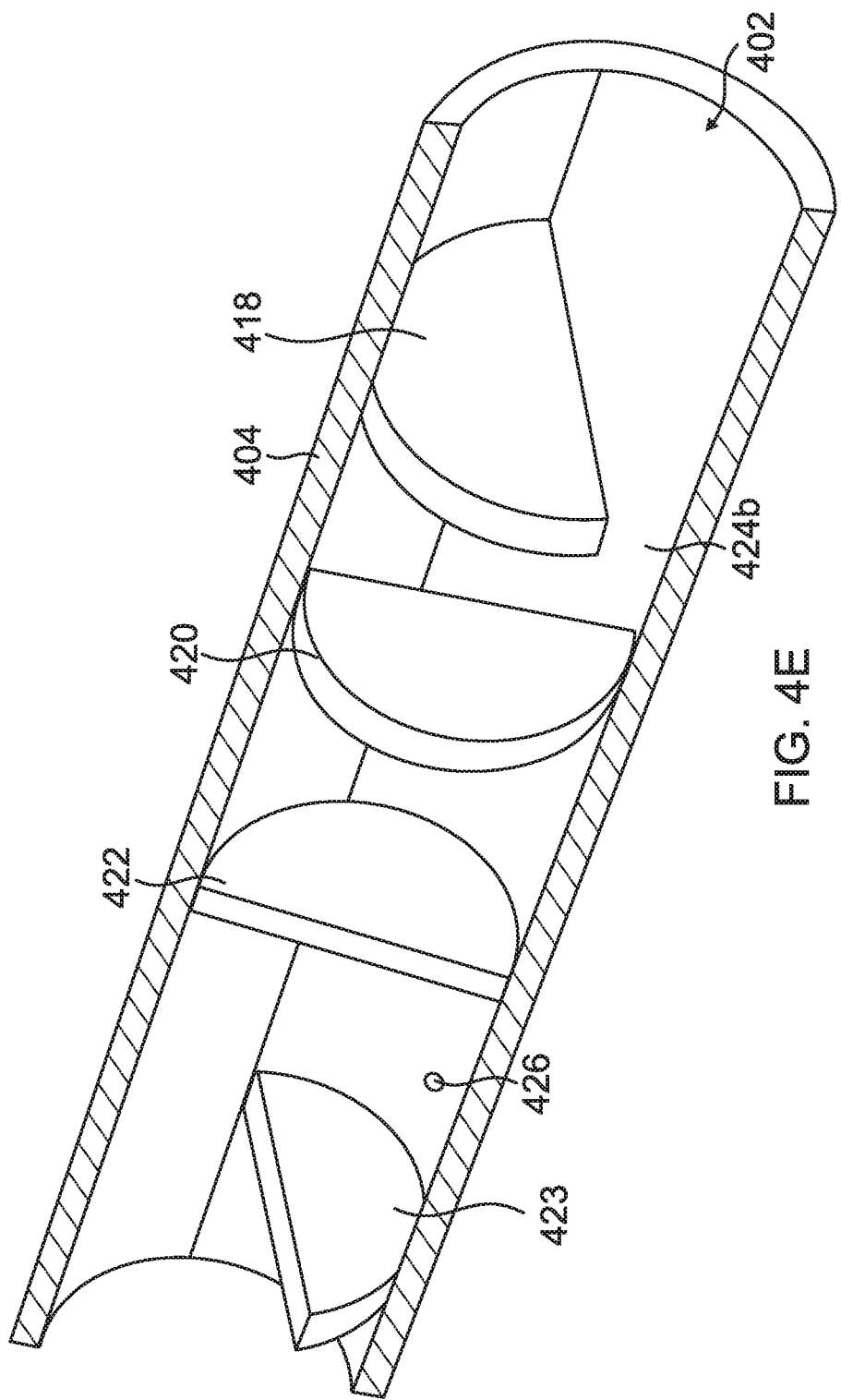

FIGS. 4D and 4E illustrate two installation options for air data probe 400 of FIG. 4A. Specifically, these figures show the relative orientations of the various dams in the two illustrated installation options. First, in FIG. 4D, the pair of dams 420 and 422 provide the protection from water and ice traveling down the internal flow path 402 of pitot tube 404 in this orientation. Dam 420 is the forward of the two dams and is located substantially within a top half of the pitot probe 404. Dam 422 is a rear of the two dams and is located substantially within a bottom half of the pitot probe 404. In this embodiment, the other pair of dams, 418 and 423, are rotated so that they do not effectively block water or ice from traveling down the internal flow path 402.

When water or ice crystals enter internal flow path 402, the water or ice crystals impact either dam 420 or 422. The water or ice crystals that impact dam 422 (rear dam) puddle up on bottom 424 of pitot tube 404 in front of dam 422 and exit the internal flow path 402 via drain hole 426. Further, dam 422 has a height, h, that can be as large as the radius of the internal flow path 402 or greater. As with the embodiment of FIG. 2A, this height allows the water to fill approximately half of the height of the pitot tube 404 before overflowing downstream toward the pressure sensing element. Water and ice crystals that impact dam 420, the forward dam of the pair, drop to bottom 424 of pitot probe 404 and puddle up in front of dam 422 and exit the internal flow path 402 through the drain hole 426.

In FIG. 4E, the pair of dams 418 and 423 provide the protection from water and ice traveling down the internal flow path 402 of pitot tube 404 in this orientation. Dam 418 is the forward of the two dams and is located substantially within a top half of the pitot probe 404. Dam 423 is a rear of the two dams and is located substantially within a bottom half of the pitot probe 404 in this orientation. In this embodiment, the other pair of dams, 420 and 422, are rotated so that they do not effectively block water from flowing down the internal flow path 402.

When water or ice crystals enter internal flow path 402, the water or ice crystals impacts the dams it puddles up on bottom 424b of pitot tube 404 in front of dam 423 and exit the internal flow path 402 via drain hole 426. Further, dam 423 has a height, h, that can be as large as the radius of the internal flow path 402 or greater. As with the embodiment of FIG. 2A, this height allows the water to fill approximately half of the height of the pitot tube 404 before overflowing downstream toward the pressure sensing element. Water and ice crystals that impact dam 418, the forward dam of the pair, drop to bottom 424b of pitot probe 404 and puddle up in front of dam 423 and exit the internal flow path 402 through the drain hole 426.

Figure 5:
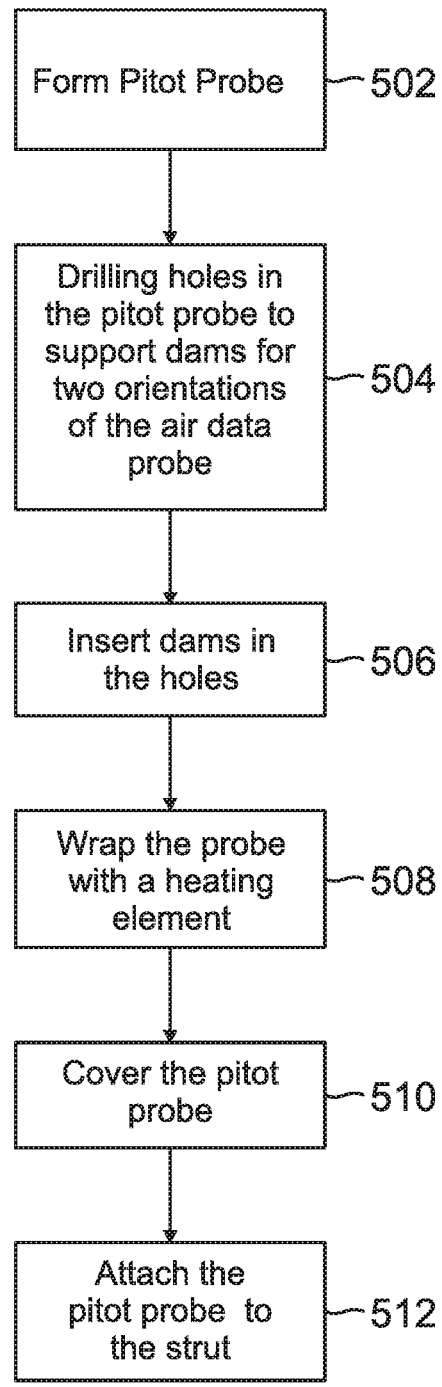
FIG. 5 is a flow diagram of one embodiment of a process for manufacturing air data probe such as the air data probes shown in FIGS. 2A and 4A.

FIG. 5 is a flow diagram of one embodiment of a process for manufacturing an air data probe such as the air data probes shown in FIGS. 2A and 4A. The process begins at block 502 with the formation of a pitot probe such as pitot probe 204 of FIG. 2A or pitot probe 404 of FIG. 4A. At block 504, holes are drilled in the pitot probe to receive dams to support at least two orientations or installations of the air data probe. In one embodiment, three holes are drilled in the pitot probe to receive dams in the orientation shown and described above with respect to FIG. 2A. Alternatively, in another embodiment, four holes are drilled in the pitot probe to enable insertion of four dams such as shown and described above with respect to FIG. 4A. Additionally, drain holes are also drilled in or near a location that is the bottom of the pitot probe for an installation of the air data probe.

With the pitot probe prepared, the dams are added to the air data probe. At block 506, the dams are inserted into the holes and secured in place. At block 509, a heating element is added to the air data probe. In one embodiment, the heating element is added in a channel that is etched in a surface of the pitot tube such as shown in FIGS. 2A-2C, 4A and 4B. At block 510, the pitot probe is covered so enclose the heating element and the pitot probe is attached to a stud at block 512.

Advantageously, this process enables the heater layout to be designed to properly heat each dam because the dams are formed into the probe first, and the heater can then be formed or wrapped around the probe and dams. In turn, the design enables the dams to effectively block, melt, and drain the ice crystals/water droplets so that the water/ice crystals do not travel downstream of the pitot probe. This approach also simplifies the manufacturing process of the probe because the integration of the heater is separated from the layout requirements of the internal dams.

EXAMPLE EMBODIMENTS

Example 1 includes an air data probe comprising: a pitot probe having a mounting base or flange, support strut, and tube with a forward facing inlet that is configured to capture a total pressure of the surrounding air; at least three dams placed within the tube of the pitot probe for blocking the ballistic trajectory of water droplets or ice crystals from passing directly through the tube to a downstream pressure sensing element; a heater element integrated into the tube of the pitot probe on the outside of the dams; and wherein the at least three dams are oriented within the tube of the pitot probe in such a way that the dam locations are configured for two or more installations of the air data probe.

Example 2 includes the air data probe of Example 1, wherein at least one of the at least three dams is positioned to provide a barrier to the flow of water or ice crystals along the bottom of the pitot probe when the air data probe is installed in a first orientation, wherein the at least one of the dams has a shape that blocks some of the internal flow path of the pitot probe, and at least one other of the at least three dams is positioned to provide a barrier to the flow of water or ice crystals along the bottom of the pitot probe when the air data probe is installed in a second, different orientation, wherein the at least one other of the at least three dams has a shape that blocks some of the internal flow path of the pitot probe.

Example 3 includes the air data probe of any of Examples 1-2, and further including at least two drain holes, each of the at least two drain holes located in a position that is approximately in the bottom of the pitot probe for a respective installation of the air data probe.

Example 4 includes the air data probe of any of Examples 1-3, wherein each dam of the at least three dams has a semicircular shape.

Example 5 includes the air data probe of any of Examples 1-4, wherein the at least three dams comprises four dams with a first pair of dams configured for a first installation and a second pair of dams configured for a second installation.

Example 6 includes the air data probe of Example 5, wherein the first pair of dams includes a first forward dam that is located in a top half of the pitot probe and a first rear dam that is located in a bottom half of the pitot probe in the first installation.

Example 7 includes the air data probe of Example 6, wherein the second pair of dams includes a second forward dam that is located in a top half of the pitot probe and a second rear dam that is located in a bottom half of the pitot probe in the second installation.

Example 8 includes the air data probe of any of Examples 5-7, wherein the first pair of dams is offset from the second pair of dams by approximately 90 degrees rotation within the pitot probe.

Example 9 includes the air data probe of any of Examples 7-8, wherein the first and second forward dams are offset by approximately 90 degrees and the first and second rear dams are offset by approximately 90 degrees.

Example 10 includes the air data probe of any of Examples 5-8, wherein the first pair of dams have a combined surface area that covers at least the cross sectional area of an internal flow path of the tube of the pitot probe.

Example 11 includes a method for manufacturing an air data probe, the method comprising: forming a pitot probe having a tube; drilling two holes through the tube for insertion of a pair of dams, wherein at the holes are located on opposite sides of a plane that bisects the tube along a central axis of the tube; drilling at least one additional hole through the tube at a different location from the first two holes for insertion of at least one additional dam so that the dams support at least two orientations of the air data probe; inserting dams in each of the holes, wherein the dams are configured for blocking the ballistic trajectory of water droplets or ice crystals from passing directly through the tube to a downstream pressure sensing element; wrapping the tube of the pitot probe with a heating coil that engages the tube of the pitot probe and each of the dams; covering the tube of the pitot probe with a cover; and attaching the pitot probe to a strut.

Example 12 includes the method of Example 11, wherein forming a pitot probe includes forming a channel in an exterior surface of the pitot probe to receive the hearting coil.

Example 13 includes the method of any of Examples 11-12, wherein drilling at least two holes and at least one additional hole comprises drilling four holes to receive two pair of dams, wherein each pair of dams is associated with a different installation of the air data probe.

Example 14 includes the method of Example 13, and further including drilling at least two drain holes in the tube of the pitot probe, each drain hole associated with one of two different installations of the air data probe.

Example 15 includes the method of any of Examples 13-14, wherein drilling four holes includes: drilling a first pair of holes for a first installation, the first pair of holes including a first upper hole and a first lower hole; and drilling a second pair of holes for a second installation, the second pair of holes including a second upper hole and a second lower hole.

Example 16 includes a pitot probe comprising: a tube with a forward facing inlet that is configured to capture a total pressure of the surrounding air; two pair of dams placed within the tube of the pitot probe for blocking the ballistic trajectory of water droplets or ice crystals from passing directly through the tube to a downstream pressure sensing element; a heater element integrated into the tube of the pitot probe on the outside of the two pair of dams; at least two drain holes formed in the tube to enable water to escape from the tube; wherein a first pair of the two pair of dams is positioned to provide a barrier to the flow of water or ice crystals along the bottom of the tube when the pitot probe is installed in a first orientation, wherein one of the dams in the first pair of dams has a shape that blocks approximately half of the height of the internal flow path of the tube, and wherein a second pair of the two pair of dams is positioned to provide a barrier to the flow of water or ice crystals along the bottom of the tube when the pitot probe is installed in a second, different orientation, wherein one of the dams in the second pair of dams has a shape that blocks approximately half of the height of the internal flow path of the pitot probe.

Example 17 includes the pitot probe of Example 16, wherein the first pair of dams is offset from the second pair of dams by approximately 90 degrees rotation within the tube.

Example 18 includes the pitot probe of any of Examples 16-17, wherein the first pair of dams includes a first forward dam that is located in a top half of the tube and a first rear dam that is located in a bottom half of the tube in the first installation; and wherein the second pair of dams includes a second forward dam that is located in a top half of the tube and a second rear dam that is located in a bottom half of the tube in the second installation.

Example 19 includes the pitot probe of any of Examples 16-18, wherein the first pair of dams have a combined surface area that covers at least the cross sectional area of an internal flow path of the tube of the pitot probe.

Example 20 includes the pitot probe of any of Examples 16-19, wherein each of the two drain holes located in a position that is approximately in the bottom of the tube for a respective orientation of the pitot probe.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An air data probe comprising:
a pitot probe having a mounting base or flange, support strut, and tube with a forward facing inlet that is configured to capture a total pressure of the surrounding air;
at least three dams placed within the tube of the pitot probe for blocking the ballistic trajectory of water droplets or ice crystals from passing directly through the tube to a downstream pressure sensing element;
a heater element integrated into the tube of the pitot probe on the outside of the dams; and
wherein the at least three dams are oriented within the tube of the pitot probe such that a first pair of the at least three dams includes a first dam located in front of and above a second dam of the at least three dams in a first orientation of the pitot probe, and a second pair of the at least three dams includes a first dam located in front of and above a second dam of the at least three dams in a second orientation of the pitot probe, and, in each orientation, a drain hole is located in front of the second dam.

2. The air data probe of claim 1, wherein
at least one of the at least three dams is positioned to provide a barrier to the flow of water or ice crystals along the bottom of the pitot probe when the air data probe is installed in the first orientation, wherein the at least one of the dams has a shape that blocks some of the internal flow path of the pitot probe, and
at least one other of the at least three dams is positioned to provide a barrier to the flow of water or ice crystals along the bottom of the pitot probe when the air data probe is installed in the second, different orientation, wherein the at least one other of the at least three dams has a shape that blocks some of the internal flow path of the pitot probe.

3. The air data probe of claim 1, wherein each of the drain holes located in a position that is approximately in the bottom of the pitot probe for a respective orientation of the air data probe.

4. The air data probe of claim 1, wherein the at least three dams comprises four dams with a first pair of dams configured for the first orientation and a second pair of dams configured for the second orientation.

5. The air data probe of claim 4, wherein the first pair of dams includes a first forward dam that is located in a top half of the pitot probe and a first rear dam that is located in a bottom half of the pitot probe in the first orientation.

6. The air data probe of claim 5, wherein the second pair of dams includes a second forward dam that is located in a top half of the pitot probe and a second rear dam that is located in a bottom half of the pitot probe in the second orientation.

7. A method for manufacturing an air data probe, the method comprising:
forming a pitot probe having a mounting base or flange, support strut, and a tube with a forward facing inlet that is configured to capture a total pressure of the surrounding air;
drilling two holes through the tube for insertion of a pair of dams, wherein the holes are located on opposite sides of a plane that bisects the tube along a central axis of the tube,
drilling at least one additional hole through the tube at a different location from the first two holes for insertion of at least one additional dam;
inserting dams in each of the holes, wherein the dams are configured for blocking the ballistic trajectory of water droplets or ice crystals from passing directly through the tube to a downstream pressure sensing element;
integrating a heater element into the tube of the pitot probe on the outside of the dams; and
wherein a first pair of the dams includes a first dam located in front of and above a second dam of the dams in a first orientation of the pitot probe, and a second pair of dams includes a first dam located in front of and above a second dam of the dams in a second orientation of the pitot probe, and, in each orientation, a drain hole is located in front of the second dam.

8. The method of claim 7, wherein forming a pitot probe includes forming a channel in an exterior surface of the pitot probe to receive the hearting element.

9. The method of claim 7, wherein drilling at least two holes and at least one additional hole comprises drilling four holes to receive two pair of dams, wherein each pair of dams is associated with a different orientation of the air data probe.

10. The method of claim 9, and further including drilling at least two drain holes in the tube of the pitot probe, each drain hole associated with one of two different orientations of the air data probe.

* * * * *